United States Patent
Koulouh

(10) Patent No.: US 11,041,599 B2
(45) Date of Patent: Jun. 22, 2021

(54) HEADLIGHT WITH REDUCED MOVABLE CUT-OFF SURFACE FOR A MOTOR VEHICLE

(71) Applicant: AML SYSTEMS, Paris (FR)

(72) Inventor: Hassan Koulouh, Le Pré Saint Gervais (FR)

(73) Assignee: AML SYSTEMS, Paris (FR)

( * ) Notice: Subject to any disclaimer, the term of this patent is extended or adjusted under 35 U.S.C. 154(b) by 0 days.

(21) Appl. No.: 16/070,606

(22) PCT Filed: Jan. 19, 2017

(86) PCT No.: PCT/FR2017/050106
§ 371 (c)(1),
(2) Date: Jul. 17, 2018

(87) PCT Pub. No.: WO2017/125681
PCT Pub. Date: Jul. 27, 2017

(65) Prior Publication Data
US 2020/0217474 A1    Jul. 9, 2020

(30) Foreign Application Priority Data
Jan. 20, 2016  (FR) ...................................... 1650443

(51) Int. Cl.
*F21S 41/686* (2018.01)
*F21S 45/10* (2018.01)
(Continued)

(52) U.S. Cl.
CPC ............ *F21S 41/686* (2018.01); *B60Q 1/076* (2013.01); *F21S 41/40* (2018.01); *F21S 45/10* (2018.01); *F21W 2102/135* (2018.01)

(58) Field of Classification Search
CPC .......... F21S 41/686; F21S 45/10; F21S 41/40; B60Q 1/076; F21W 2102/135
See application file for complete search history.

(56) References Cited

U.S. PATENT DOCUMENTS 5,251,110 A    10/1993  Leleve
2007/0147061 A1 *  6/2007  Lee ........................ F21S 41/43
                                         362/513
(Continued)

FOREIGN PATENT DOCUMENTS

DE     19708111 A1    9/1998
EP     0294589 A2    12/1988
(Continued)

OTHER PUBLICATIONS

English Translation of the Written Opinion of the International Searching Authority dated May 22, 2017, in corresponding International Application No. PCT/FR2017/050106, filed Jan. 19, 2017, 6 pages.

(Continued)

*Primary Examiner* — Donald L Raleigh
(74) *Attorney, Agent, or Firm* — Christensen O'Connor Johnson Kindness PLLC

(57) ABSTRACT

A headlight includes a frame defining a beam passage opening, a stationary protective cover, and a cut-off mechanism including a movable assembly and at least one actuating motor, the movable assembly including a cut-off bar provided with a cut-off blade, the cut-off bar being movable by the actuating motor between at least one closure position, in which the cut-off blade partially closes off the opening in the region of the stationary protective cover, and a retracted position, in which the cut-off blade unblocks the opening, the protective cover including at least one closure plate, the closure plate and the cut-off blade being designed to engage together to form a closure surface in the closure position.

7 Claims, 3 Drawing Sheets

(51) Int. Cl.
  *F21S 41/40*        (2018.01)
  *B60Q 1/076*        (2006.01)
  *F21W 102/135*      (2018.01)

(56) References Cited

U.S. PATENT DOCUMENTS

2014/0145612 A1* 5/2014 Takagaki ............. B60Q 1/1423
                                                            315/82
2016/0010824 A1* 1/2016 Noronha ............... F21S 41/686
                                                            362/512

FOREIGN PATENT DOCUMENTS

EP          2062775  A1      5/2009
EP          2966345  A1      1/2016

OTHER PUBLICATIONS

International Search Report dated May 22, 2017, issued in corresponding International Application No. PCT/FR2017/050106, filed Jan. 19, 2017, 3 pages.
Written Opinion of the International Searching Authority dated May 22, 2017, issued in corresponding International Application No. PCT/FR2017/050106, filed Jan. 19, 2017, 6 pages.
Second Chinese Office Action dated Aug. 11, 2020, issued in corresponding CN Application No. 201780008484.6, filed Jan. 19, 2017, 14 pages.

* cited by examiner

HEADLIGHT WITH REDUCED MOVABLE CUT-OFF SURFACE FOR A MOTOR VEHICLE

The field of the present invention is that of headlights and more particularly that of headlights for a motor vehicle.

Motor vehicle headlights generally comprise a light source that projects lights onto a reflector. The light is next reflected onto a lens in order to be inverted and sent back in the form of a light beam outside the vehicle. Headlights also comprise a cut-off mechanism for obscuring or not a part of the reflected beam, as well as means for controlling the shape of the beam in order to adapt it to the driving circumstances.

Using cut-off mechanisms comprising a rotary cut-off bar are known. The cut-off bar is electrically actuated so as to move, on command, between at least two angular positions in which it obscures the light beam to a greater or lesser extent. In the case of a so-called dual-function headlight, these two positions are a first angular position in which the cut-off bar obscures part of the light beam in order to limit the range of the headlight to that of dipped beams in order not to dazzle the other drivers travelling in the opposite direction, and a second angular position in which it does not obscure the light beam, the range of the headlight then corresponding to that of main beams. There also exist so-called multifunction headlights, in which the cut-off bar can adopt more than two angular positions in order to selectively obscure the light beam.

The devices of the prior art that control the position of the cut-off bar generally consist of an actuation motor associated with a sensor for the position of the cut-off bar or with a stop that defines the idle position of the cut-off bar. For safety reasons, this idle position is associated with the dipped-beam position, in order to avoid dazzling of the drivers coming in the opposite direction in the case of failure of the bar-actuation device. Return to the stop position or to the extreme position is generally provided by a return spring.

The cut-off bar is actuated electrically by an actuator comprising an electric motor. For implementing the actuation motor, it is known to use an electromagnet, which, against the return spring, exerts an attraction force on a movable device connected to the cut-off bar.

Such a cut-off mechanism is able to implement functions of controlling the beam, of the ADB ("Adaptive Driving Beam") type. Such an ADB function, which makes it possible to select various types of beam, offers a significant advantage to the driver of the motor vehicle. However, the cut-off mechanisms intended to implement such an ADB function require expensive technologies, such as actuation by a stepping motor, a position sensor, etc.

In particular, the actuation motor as described above is generally relatively expensive.

Because of its high cost, such a usual headlight implementing an ADB function generally remains limited to motor vehicles of the upmarket type.

The aim of the present invention is to propose a headlight for a motor vehicle that does not have the drawbacks of the prior art and in particular which, while enabling the aforementioned functions (dual-function or multifunction) to be implemented via a cut-off mechanism, is of reduced cost.

To this end, the invention relates to a cut-off mechanism for a motor vehicle headlight, said headlight comprising at least:
a frame provided with an opening for a beam to pass, said opening being able to be closed off over a closure zone;
at least one stationary protective cover, arranged on the headlight so as to delimit a part of the opening at the frame; and
a cut-off mechanism comprising a movable assembly and at least one actuation motor, the movable assembly comprising a movable device and a cut-off bar provided with a cut-off blade, said cut-off bar being movable under the action of the actuation motor via the movable device between at least one closure position in which the cut-off blade partially closes off said opening at said stationary protective cover, and a retracted position in which the cut-off blade clears said opening.

According to the invention, said stationary protective cover comprises at least one stationary auxiliary closure plate, secured to it, and said closure plate and said cut-off blade are configured so as to cooperate together in order to form a closure surface in the closure position of the cut-off bar, said closure surface corresponding to said closure zone, at least a first part of which is closed solely by the cut-off blade and at least a second part of which is closed solely by the closure plate.

Thus, thanks to the fitting of the closure plate, the size of the surface that the closure plate must close is limited. It is thus possible to reduce the size of the cut-off blade, which give rise to a reduction in its mass. By virtue of this reduction in mass of the cut-off blade and therefore of the cut-off bar, the mass to be moved by the actuation motor is reduced so that it is possible to use a less expensive actuation motor, which remedies the aforementioned drawback.

In addition, such a reduced-cost actuation motor generally presents other advantages such as, especially, greater compactness.

For implementing the invention, the protective cover, which is in general already present on the headlight, is therefore used to implement a thermal protection function, which reduces the cost. The closure plate can thus also participate in this thermal protection function.

Advantageously, said closure plate is arranged so as to delimit a bottom edge of the opening.

Preferably, said protective cover and said closure plate are produced in a single piece, which especially facilitates its manufacture and the implementation of the invention, and reduces the cost.

Furthermore, advantageously, the closure plate has one of the following forms:
a generally rectangular form;
a generally square form.

In a particular preferred embodiment, the cut-off blade is a substantially rectangular elongated blade provided with at least one cut-out, said cut-out being positioned on the cut-off blade so as to be brought, in the closure position, into at least part of said second part of the closure zone.

Moreover, advantageously, the cut-off mechanism is configured so as to be able to bring the cut-off bar into said retracted position and into said closure position, in which the opening is closed over the whole of said closure zone, and in addition into at least one partial closure position in which the opening is closed over a partial closure zone, smaller than said closure zone.

Advantageously, the present invention can be applied to various types of headlights, in particular to headlights comprising various normal types of cut-off mechanism.

Thus, in a first particular embodiment, the cut-off mechanism of the headlight is configured to move the cut-off bar by rotation about a rotation axis positioned in a general plane of the protective cover.

Furthermore, in a second particular embodiment, the cut-off mechanism of the headlight is configured to move the cut-off bar, by rotation about a rotation axis positioned orthogonally to a general plane of the protective cover.

The invention will be understood better, and other aims, details, features and advantages therefore will emerge more clearly during the following detailed explanatory description of an embodiment of the invention given by way of purely illustrative and non-limitative example with reference to the accompanying schematic drawings. In these drawings.

Figure 1:
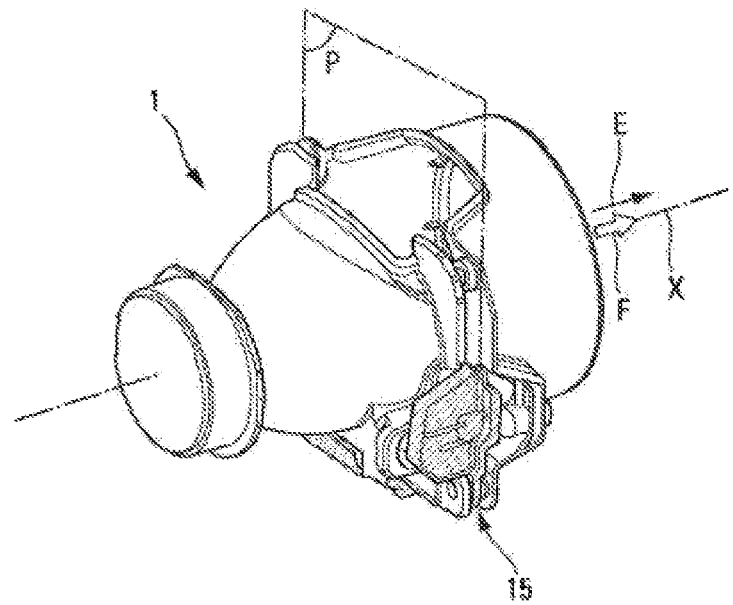
FIG. 1 is a perspective view of a motor vehicle headlight.

Referring to FIG. 1, a motor vehicle headlight 1 configured to generate a light beam (represented schematically by an arrow F) can be seen in perspective. As usual, the headlight 1 generally comprises a generally rectangular shaped frame, specified below, which is arranged substantially parallel to a plane P. The plane P is orthogonal to an optical axis X of the light beam F.

The frame 2 comprises an opening 3 that is preferably cut out at its center in order to allow the light beam to pass, as shown in FIGS. 2 to 6.

In a way that is not visible, behind this frame, there are disposed a light source generating the light beam and a reflector that orients this light beam towards the front and towards a lens that is installed towards the front of the headlight 1.

The headlight 1 comprises, in addition to the lens, usual means for controlling the shape of the beam in order to adapt it to the circumstances of the driving of the vehicle.

In the present description, the terms front and rear are defined with respect to the direction of emission of the light beam F, that is to say with respect to the direction of the arrow E in FIG. 1, and the terms bottom, top and vertical are defined with respect to the position of the headlight on the vehicle.

A cut-off mechanism 4, the function of which is to more or less close off the light beam according to the driving conditions of the vehicle, is fixed to the frame 2.

To do this, the frame 2 is provided a beam-passage opening 3, and this opening 3 can be closed over a so-called closure zone.

The cut-off mechanism 4 is disposed between the reflector and the lens, not shown. The cut-off mechanism 4 makes it possible to more or less close off the light beam in reaction to a command from the user of the motor vehicle or an automatic command, in order to offer various modes for illuminating the road.

Figure 2:
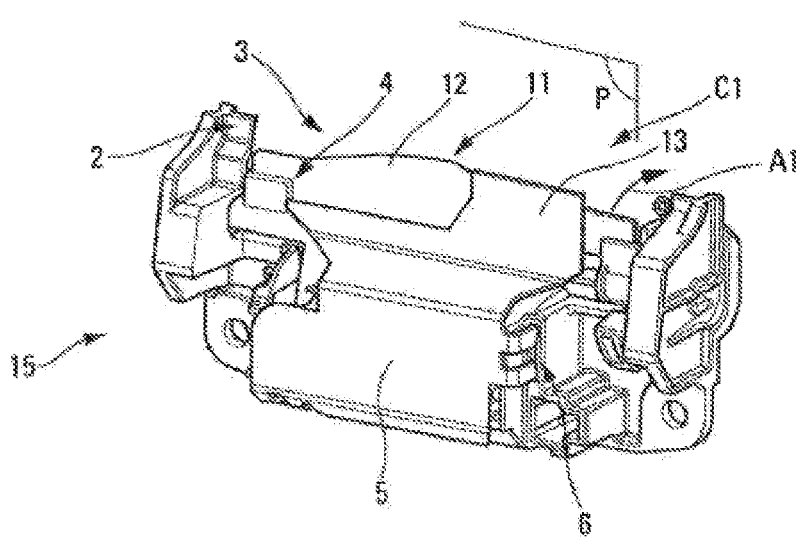
FIG. 2 is a perspective view of a part of a headlight showing a cut-off assembly according to a first embodiment of the invention.
Figure 3:
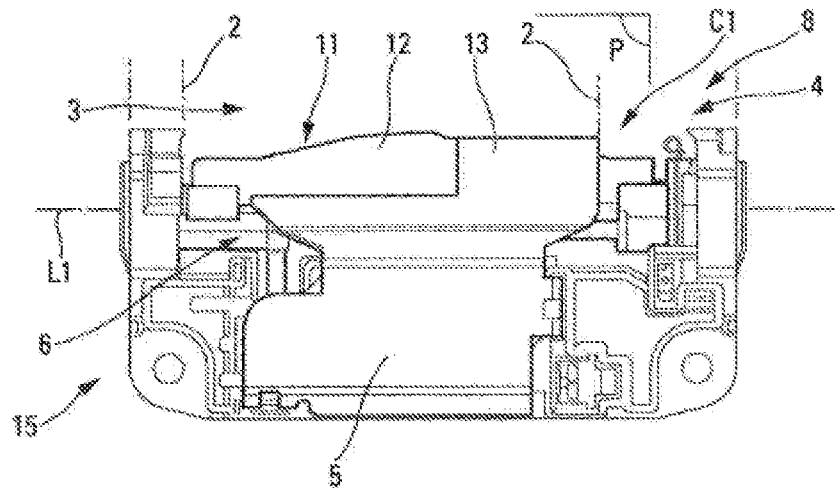
FIGS. 3 and 4 are front views of the cut-off assembly in FIG. 2, respectively in a dipped-beam position and a main-beam position.
Figure 4:
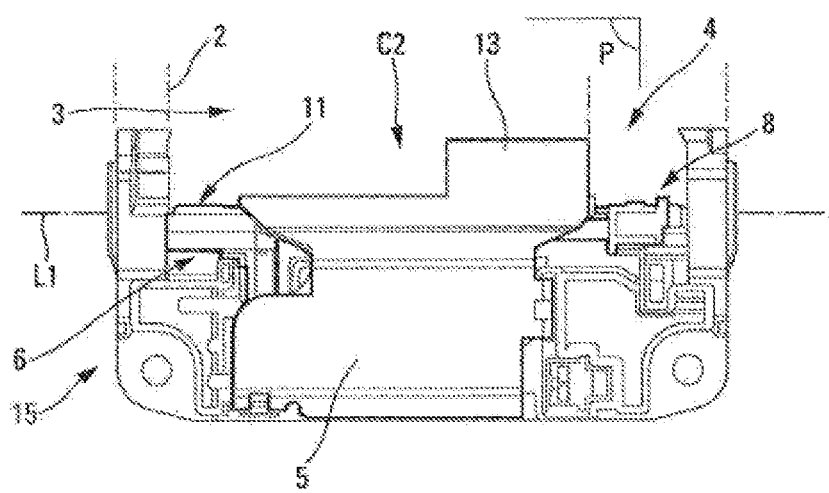

Referring to FIGS. 2 to 4, there can be seen, respectively in the dipped-beam or passing position (FIGS. 2 and 3) and in the main-beam position (FIG. 4), the cut-off mechanism 4 that is mounted at the bottom part of the frame 2 shown partially and schematically in FIGS. 3 and 4.

This frame 2 comprises a stationary protective cover 5 that delimits the opening 3 on the edge 6 of the bottom. The protective cover 5 has a thermal protection function, against the heat generated by the light source. Thus arranged, it delimits on the headlight a part of the opening 3 at the level of frame 2.

The cut-off mechanism 4 comprises a movable assembly 8 and an actuation motor 9. The movable assembly 8 comprises a movable device 10 and a cut-off bar 11 provided with a cut-off blade 12, as shown especially in FIGS. 5 and 6. The cut-off bar 11 is movable, in the usual way, under the action of the actuation motor 9 via the movable device 10.

Cut-off blade 12 means the part (or blade) of the cut-off bar 11 that is intended to close off the beam.

The cut-off bar 11 is moved in order to modulate the form of the beam F out from the headlight 1. This cut-off bar 11, which is moved by the actuation motor 9, is movable in rotation, about a rotation axis L1 (FIGS. 3 and 4) or L2 (FIGS. 5 and 6), in the plane P that is orthogonal to the axis X of the light beam F.

The cut-off bar 11 is movable under the action of the actuation motor 9 between at least two positions, and especially between:

a closure position C1 (FIGS. 2, 3 and 5), in which the cut-off blade 12 partially closes off said opening 3 above the stationary protective cover 5; and a retracted position C2 (FIGS. 4 and 6) in which the cut-off blade 12 clears the opening 3.

The actuation motor 9 therefore enables the cut-off bar 11 to be positioned in a plurality of positions, in particular according to the aforementioned two positions, in order to more or less close off the light beam.

In a preferred embodiment, the actuation motor 9 for actuating the cut-off bar 11 comprises an electromagnet (not shown). This electromagnet may comprise a winding, and a stationary ferromagnetic core, substantially cylindrical, which is placed at the center of this winding, along its axis of symmetry.

In FIG. 4, corresponding to the main-beam position, the cut-off bar 11 is retracted, that is to say it is inclined forwards, as illustrated by an arrow A1 in FIG. 2, from the position in FIGS. 2 and 3. The cut-off bar 11 thus allows the light beam to pass.

On the other hand, in FIGS. 2 and 3, corresponding to the dipped-beam (or passing) position, the cut-off bar 11 is raised, and cuts off the light beam over a larger surface area than the stationary protective cover 5 would do alone. After its inversion by the lens, the light beam is then oriented downwards, which avoids dazzling the drivers of the vehicles coming in the opposite direction.

According to the invention, the protective cover 5 comprises at least one fixed closure plate 13, which is secured to it. The closure plate 13 is arranged on the vertical side of the protective cover 5 delimiting the opening 3, that is to say at the top of the protective cover 5 in FIGS. 2 to 6.

In addition, according to the invention, the closure plate 13 of the stationary protective cover 5 and the cut-off blade 12 of the cut-off bar 11 are configured so as to cooperate together, in order to form together a closure surface in the closure position C1 (FIGS. 2, 3 and 5) of the cut-off bar 11.

This closure surface thus obtained corresponds, according to the invention, to the closure zone that must be closed off in the closure position C1. Thus, for this closure surface, at least a first part is closed off solely by the cut-off blade 12 and at least a second part is closed off solely by the closure plate 13.

The cut-off mechanism 4 and the protective cover 5 provided with a closure plate 13 form together said cut-off assembly 15.

Thus, thanks to the closure plate 13, the size of the surface area that the cut-off blade 12 must close off is limited. In this way the size of the cut-off blade 12 is reduced, which give rise to a reduction in its mass. Thanks to this reduction in mass of the cut-off blade 12 and therefore of the cut-off bar 11, the mass to be moved by the actuation motor 9 is reduced so that it is possible to use an actuation motor 9 with reduced cost. Such an actuation motor 9 of reduced cost also has other advantages such as great compactness especially.

Preferably, the protective cover 5 and the closure plate 13 are produced in a single piece, which in particular facilitates manufacture and reduces the cost.

For implementation of the invention (and for participating in the closure), use is therefore made of the protective cover 5 provided with the enclosure plate 13, which is already present on the headlight, but for another function, namely for a thermal protection function. The closure plate 13 can thus also participate in this thermal protection function, and therefore fulfils a dual function:

a thermal protection function; and
a closure function.

The closure plate 13 may have various geometric forms. Preferably, although not exclusively, it has one of the following forms:

a generally rectangular form, as shown in FIGS. 2 to 6; or
a generally square form.

Figure 5:
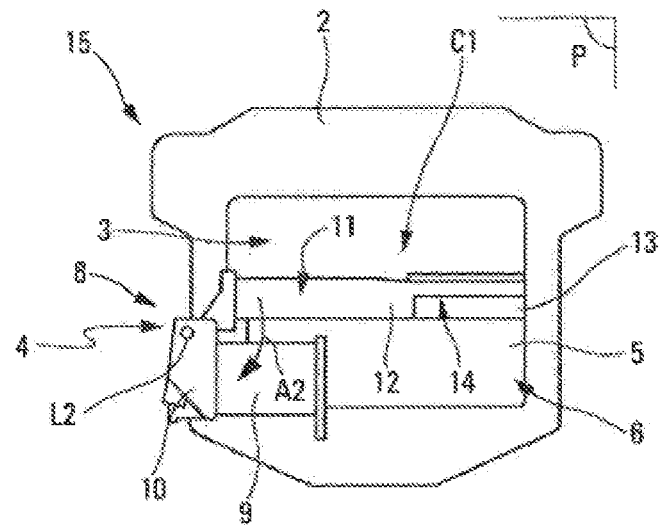
FIGS. 5 and 6 are front views of a cut-off assembly according to a second embodiment, respectively in a dipped-beam position and a main-beam position.
Figure 6:
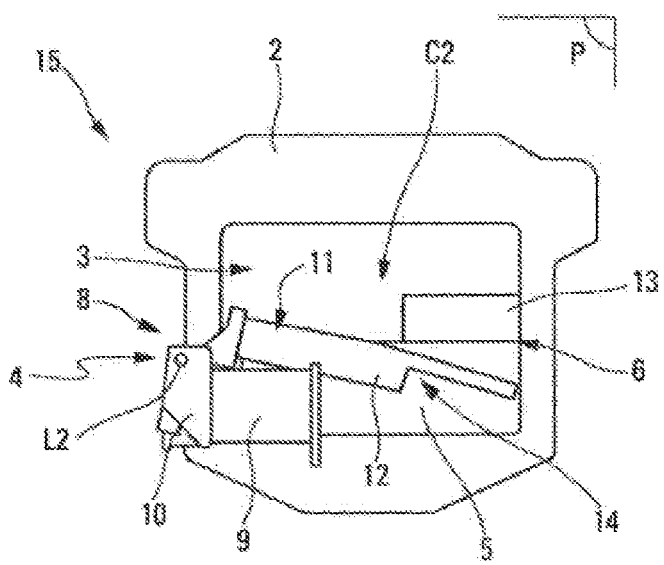

In a particular preferred embodiment, the cut-off blade 12 is a substantially rectangular elongated blade provided with at least one cut-out 14, as shown in FIGS. 5 and 6. This cut-out (or absence of material) 14, for example rectangular, is positioned on the cut-off blade 12 in order to be brought, in the closure position, superimposed on the part of the closure zone closed off by the closure plate 13. This is because, at this point, it is not necessary for the cut-off blade 12 to close off the opening since this is already achieved by the closure plate 13.

Thanks to this cut-out 14, the size of the cut-off blade 12, and therefore its mass, is reduced. Through this reduction in mass of the cut-off blade 12 and therefore of the cut-off bar 11, the mass to be moved by the actuation motor 9 is reduced.

In a preferred embodiment, the cut-off mechanism 4 is of the dual-function type. It is therefore configured to be able to bring the cut-off bar 11 into one or another of the following two positions:

said retracted position C2 (corresponding to the main-beam position of the headlight 1), in which the cut-off blade 12 clears the opening 3; and
said closure opening C1 (corresponding to the dipped-beam position of the headlight 1), in which the opening 3 is closed off over the whole of said closure zone.

However, in a variant embodiment, the cut-off mechanism 4 may be of the multifunction type. In this case, it is configured to bring the cut-off bar 11, in addition to said retracted position C2 and said closure position C1, into one or more partial closure positions, in each of which the opening is closed off over a corresponding partial closure zone, smaller than said closure zone (closed off in the closure position C1). Such a partial closure position is obtained by an angular position of the cut-off bar 11 that is situated between the extreme angular positions of the positions C1 and C2.

The present invention can be applied in various types of headlights, especially to headlights comprising various normal types of cut-off mechanism.

Thus, in a first particular embodiment, shown in FIGS. 2 to 4, the cut-off mechanism 4 of the headlight 1 is configured to move the cut-off bar 11, by rotation about the rotation axis L1, as illustrated in FIG. 2 by the arrow A1 for moving from the closure position C1 into the retracted position C2. In this first embodiment, the rotation axis L1 is positioned in the general plane P of the opening 3 and therefore of the protective cover 5, as shown in FIGS. 3 and 4.

Furthermore, in a second particular embodiment, shown schematically in FIGS. 5 and 6, the cut-off mechanism 4 of the headlight 1 is configured to move the cut-off bar 11, by rotation, about a rotation axis L2, as illustrated in FIG. 5 by an arrow A2 for moving from the closure position C1 into the retracted position C2. In this second particular embodiment, the rotation axis L2 is positioned orthogonally to the general plane P.

In FIG. 6, corresponding to the main-beam position, the cut-off bar 11 is retracted, that is to say is inclined downwards, as illustrated by the arrow A2 in FIG. 5, from the position in FIG. 5. The cut-off bar 11 thus allows the light beam to pass.

On the other hand, in FIG. 5, corresponding to the dipped-beam position, the cut-off bar 11 is raised, and cuts off the beam over a larger surface area than the protective cover 5 provided with the closure plate 13 would do alone. After its change of direction by the lens, the light beam is then oriented downwards, which avoids dazzling the drivers of the vehicles coming in the opposite direction.

The functioning of the cut-off assembly 15 as described above is described below.

The cut-off mechanism 4 is controlled by a manual command of the user of the motor vehicle or an automatic command. At such a command, the cut-off bar 11 is movable under the action of the actuation motor 9 via the movable device 10. The cut-off mechanism 4 is configured to bring the cut-off bar 11 into at least one or other of the following two positions, according to the command made:

the retracted position C2 (corresponding to the main-beam position of the headlight 1), in which the cut-off blade 12 clears the opening 3; and
the closure position C1 (corresponding to the dipped-beam position of the headlight 1), in which the opening 3 is closed off over the whole of said closure zone.

Preferably, the command is carried out between an idle position and an activation position (of the actuation motor). For safety reasons, the idle position is associated with the dipped-beam position in order to avoid dazzling drivers coming in the opposite direction in the case of failure of the actuation motor. The return to this position is generally provided by a return spring (not shown).

The invention claimed is:

1. A motor vehicle headlight, said headlight comprising at least:

a frame defining an opening for a beam to pass, said opening configured to be closed off over a closure zone;
at least one stationary protective cover arranged on the headlight so as to delimit a part of the opening at the frame; and
a cut-off mechanism comprising a movable assembly and at least one actuation motor, the movable assembly comprising a movable device and a cut-off bar provided with a cut-off blade, said cut-off bar being movable under action of the actuation motor via the movable device between at least one closure position in which the cut-off blade partially closes off said opening at said at least one stationary protective cover, and a retracted position in which the cut-off blade clears said opening,
wherein said at least one stationary protective cover comprises at least one stationary closure plate, secured to it, wherein said at least one stationary closure plate and said cut-off blade are configured so as to cooperate together in order to form a closure surface in the closure position, said closure surface corresponding to said closure zone, of which at least a first part is closed solely by the cut-off blade and of which at least a second part is closed solely by the closure plate, and wherein the cut-off blade is an elongate blade provided with at least one cut-out, said at least one cut-out being positioned on the cut-off blade so as to be in the closure position, completely closed off by the at least one stationary protective cover.

2. The headlight according to claim 1, wherein said closure plate is arranged so as to delimit a bottom edge of the opening.

3. The headlight according to claim 1, wherein said at least one stationary protective cover and said closure plate are produced in a single piece.

4. The headlight according to claim 1,
wherein the cut-off blade is positioned on the cut-off blade so as to be, in the closure position, completely closed off by the closure plate.

5. The headlight according to claim 1, wherein the cut-off mechanism is configured so as to bring the cut-off bar into said retracted position and into said closure position, in which the opening is closed over a whole of the closure zone, and in addition into at least one partial closure position in which the opening is closed over a partial closure zone, smaller than said closure zone.

6. The headlight according to claim 1, wherein said cut-off mechanism is configured to move the cut-off bar by rotation about a rotation axis positioned in a general plane of the at least one stationary protective cover.

7. The headlight according to claim 1, wherein said cut-off mechanism is configured to move the cut-off bar by rotation about a rotation axis positioned orthogonally to a general plane of the at least one stationary protective cover.

* * * * *